United States Patent [19]
Corbett

[11] 3,940,349
[45] Feb. 24, 1976

[54] COMPOSITIONS AND PROCESS FOR MAKING RIGID PLASTIC FOAMS OF MODIFIED VINYL ESTER RESINS AND SILICONE COMPOUNDS

[75] Inventor: John M. Corbett, Midland, Mich.

[73] Assignee: The Dow Chemical Company, Midland, Mich.

[22] Filed: Dec. 5, 1974

[21] Appl. No.: 529,884

Related U.S. Application Data

[63] Continuation of Ser. No. 427,758, Dec. 26, 1973.

[52] U.S. Cl. .... 260/2.5 S; 204/159.15; 204/159.19; 260/2.5 R; 260/2.5 EP; 260/2.5 N; 260/78.4 EP; 260/78.4 D; 260/824 EP; 260/827; 260/836; 260/837 R; 260/861
[51] Int. Cl.² ........................... C08J 9/00; C08J 9/30
[58] Field of Search ......... 260/2.5 N, 47 UA, 2.5 R, 260/2.5 S, 2.5 EP, 836, 837 R

[56] References Cited
UNITED STATES PATENTS

| | | | |
|---|---|---|---|
| 3,511,788 | 5/1970 | Keil | 260/2.5 P |
| 3,564,074 | 2/1971 | Swisber et al. | 260/837 |
| 3,582,391 | 6/1971 | Keil | 260/2.5 P |
| 3,634,344 | 1/1972 | Koerner | 260/2.5 N |
| 3,669,911 | 6/1972 | Najvar | 260/2.5 N |
| 3,823,098 | 7/1974 | Joslyn | 260/2.5 |

*Primary Examiner*—Richard B. Turer
*Attorney, Agent, or Firm*—H. L. Aamoth; Albin R. Lindstrom

[57] ABSTRACT

By the introduction of pendant phthalate, isophthalate or terephthalate half ester groups thermosettable vinyl ester resins can be successfully frothed using certain silicone frothing agents.

14 Claims, No Drawings

COMPOSITIONS AND PROCESS FOR MAKING RIGID PLASTIC FOAMS OF MODIFIED VINYL ESTER RESINS AND SILICONE COMPOUNDS

This is a continuation of application Ser. No. 427,758 filed Dec. 26, 1973.

BACKGROUND

Various kinds of frothing agents have been proposed in the past for making foams from thermosettable resins such as unsaturated polyesters. However, these frothing agents have not proven to be commercially useful. For this reason other methods such as polymerizing a water-in-resin emulsion followed by dewatering have been investigated.

Typical materials proposed in the art to stabilize unsaturated polyester foams are polyvinyl alcohol, ethyl cellulose, Pluronic surfactants, fatty acids, fatty alcohols, etc. A silicone oil is proposed in Belgium 638,308. An organosiloxane-oxyalkylene copolymer is suggested in FR 1,535,796. German 1,247,648 discloses preparation of polyester foams by mere mechanical frothing.

U.S. Pat. No. 3,511,788 teaches the use of certain silicone materials as foaming agents for organic liquids and plastisols. Modifications of the above silicone materials are taught in Dutch 72.09579 to be useful in making foams from unsaturated polyester resins. However, the modified silicones appear to be much more limited in their effectiveness than the scope of the Dutch patent would indicate.

SUMMARY OF THE INVENTION

It has now been discovered that certain vinyl ester resins produce a stable foam in combination with the modified silicones. It is now possible to produce thermoset foams from the above combination.

Essential to the invention is the use of vinyl ester resins which have been modified to convert at least half of the hydroxyl groups to have pendant half ester phthalate, isophthalate or terephthalate groups. As little as 1 part per hundred parts of resin (pph) of the modified silicone is effective. It is also essential that oxygen be excluded during preparation of the foam to avoid inhibition of cure. The vinyl ester resin is employed in combination with a copolymerizable monomer such as styrene.

DESCRIPTION

The invention relates to liquid thermosettable compositions and a process for making plastic foams. In its simplest form the composition comprises (a) a resin phase comprising a vinyl ester resin having pendant phthalate, isophthalate or terephthalate half ester groups and a copolyermizable monomer and (b) at least about 1 pph of a silicone frothing agent. The composition may be mechanically foamed or foaming agents may be added to produce a foam.

To cure the composition a free radical catalyst is added. In order to increase the rate of cure various cure accelerating agents may be added. Optionally, other materials may be added such as fillers, colorants and the like.

Prior to this invention the only practical way to make a foam from a vinyl ester resin was by the water-in-resin emulsion method disclosed in U.S. Pat. No. 3,669,911. While different surfactants were tested at one time or another, none were found effective in producing a stable foam directly by mechanical foaming or with foaming agents.

Dutch 72.09579 broadly teaches the utility of a silicone frothing agent to produce foams with all manner of unsaturated polyester resins. However, upon testing it was found that all polyesters do not respond and surprisingly it was found that only a certain type of vinyl ester resin did respond and produce a stable foam. It was further found that oxygen must be excluded during preparation of the foam to avoid inhibition of cure by oxygen.

Vinyl ester resins are made by reacting about equivalent amounts of an unsaturated monocarboxylic acid with a polyepoxide, e.g., two moles of methacrylic acid per mole of a diglycidyl ether of bisphenol A. However, such resins do not produce much, if any, foam with the silicone and what foam is produced has little or no stability.

U.S. Pat. No. 3,564,074, incorporated herein by reference, discloses certain vinyl ester resins which have been modified to have pendant half ester groups of dicarboxylic acids. These pendant groups are conveniently introduced by reacting the hydroxyl group formed from the epoxide/acid reaction above with a dicarboxylic acid anhydride. Essential to this invention is the use of vinyl ester resins having at least half and up to all of the hydroxyl groups converted to phthalate, isophthalate or terephthalate half ester groups.

Unsaturated monocarboxylic acids include, for example, acrylic acid, methacrylic acid, cinnamic acid, halogenated acrylic and methacrylic acids as well as a half ester of a hydroxyalkyl acrylate or methacrylate and a dicarboxylic acid. Preferably the alkyl group of the hydroxyalkyl acrylate or methacrylate has from 2 to about 6 carbon atoms. The dicarboxylic acid may be saturated or unsaturated and the anhydrides thereof, when available, are usually employed in producing the half esters.

Polyepoxides useful in preparing the vinyl ester resins are readily available commercially or can be easily prepared by well known methods. More usually the polyepoxides are polyglycidyl ethers of polyhydric phenols or alcohols prepared by reaction of epichlorohydrin with said phenols or alcohols followed by treatment with an alkali to form the epoxide (glycidyl) group. The polyepoxides may be monomeric or polymeric but have more than one epoxide group per molecule. Epoxy novalacs are considered to be a polyglycidyl ether of a polyhydric phenol. Preferred polyepoxides have epoxide equivalent weights of about 150 to 1000.

Conveniently the resins of this invention may be made according to U.S. Pat. No. 3,564,074 by reacting a vinyl ester resin with phthalic, isophthalic or terephthalic anhydride in proportions sufficient to convert at least half and up to all of the hydroxyl groups to half ester groups.

The vinyl ester resins used herein are combined with a copolymerizable vinyl monomer or mixtures thereof. The resin comprises about 30 to 70 weight percent and the monomers about 70 to 30 percent. Preferably the proportions of resin and monomer are each about 40 to 60 weight percent. Above about 70 weight percent monomer incomplete cure is found; above about 70 percent resin the mixture has a high viscosity and produces a very high density foam.

A variety of copolymerizable vinyl monomers may be used as disclosed in U.S. Pat. No. 3,564,074. The resin is frequently combined with styrene but other alkenyl aromatic monomers such as vinyl toluene, alkyl substituted styrenes such as t-butyl styrene, halogen substituted styrenes, divinyl benzene and the like may be used. Other useful monomers include the alkyl esters of acrylic and methacrylic acids (for example, the methyl, ethyl, propyl, butyl and like esters), hydroxyalkyl acrylates and methacrylates where the alkyl group generally has 2 to about 6 carbon atoms, vinyl acetate, amide monomers, and the like. The above listed monomers are illustrative only.

The resins may be cured by chemically catalyzed means, by exposing them to radiation, both actinic radiation and high energy ionizing radiation, and by thermal means. Preferably the resin (containing monomers) is cured, i.e., polymerized, by the addition of a free radical yielding catalyst such as a peroxide, a persulfate, a diazo compound and the like. Such catalysts and effective amounts thereof in the range of about 0.1 to 5 weight percent are well known to the art. To accelerate the cure it is frequently desirable to add accelerators or promoters such as N,N-dimethyl-p-toluidine, N,N-dimethyl aniline, metal salts of organic acids such as cobalt, lead or vanadium naphthenates, neodecanoates and the like. Proportions similar to the catalyst levels are commonly employed. Advantageously with a promoter-catalyst system no heating is required and the froth rapidly cures to a rigid foam.

Essential to the preparation of a froth and a foam of the above described liquid resin composition is the presence therein of at least about 1 pph (parts per hundred parts of resin/monomer) of the silicone frothing agent.

The frothing agent is a siloxane copolymer consisting essentially of (a) $SiO_2$ units, (b) $(CH_3)_3SiO_{1/2}$ units and (c) 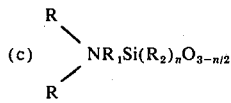 $NR_1Si(R_2)_nO_{3-n/2}$ units. In the formula $n$ has a value from 0 to 2. $R_2$ is an alkyl group having 1 to about 6 carbon atoms such as methyl, ethyl, isopropyl, butyl, hexyl, etc. Preferably $R_2$ is methyl. When $n=o$ there are no $R_2$ substituents. $R_1$ is an alkylene radical of 1 to about 6 carbon atoms such as ethylene, propylene, butylene, etc. R may be hydrogen, an alkyl radical having 1 to about 6 carbons or an aminoalkyl radical having 2 to about 6 carbon atoms. Preferably one of the R groups is hydrogen. In the siloxane copolymer the ratio of (b) units to the sum of the (a) and (c) units should be about 0.4:1 to 1.2:1. The preparation of the copolymers is fully disclosed in Dutch application 72.09579, which is incorporated herein by reference. The silicone frothing agent is used in amounts of at least about 1 pph. Larger amounts up to 4 pph and higher may be used but generally only an amount sufficient to produce a stable foam is desirably employed.

Unexpectedly, the previously described compositions produce a stable froth which may be readily cured to a rigid foam when analagous materials do not. A froth may be formed in more than one way. The composition may be mechanically frothed to incorporate gas bubbles therein. Equipment capable of mechanically producing a froth, such as an Oakes continuous frothing machine, is commercially available. Release of dissolved blowing agents under pressure also produces a satisfactory froth. A number of blowing agents such as the fluorohydrocarbons, aliphatic hydrocarbons and the like are well known. Decomposable gas-releasing blowing agents may also be used as illustrated by in situ release of hydrogen from sodium borohydride.

Preparation of the froth and foam should be done using means to exclude oxygen to avoid inhibition of cure (polymerization). This can be conveniently done in a nitrogen atmosphere or other inert gas atmosphere or by the addition of materials such as paraffin wax which form a surface film. By exclusion of oxygen it is meant to use an inert atmosphere in which no oxygen is present or one in which the oxygen level is below a level which would inhibit polymerization under the process conditions or the use of materials which exclude oxygen from the surface.

The rigid plastic foams of this invention may be made in a predetermined density range of 5 to 50 lbs/ft$^3$. They may be nailed, sawed, screwed, stained and the like for applications as simulated wood. The pour-in-place nature allows for use in cavity walls (refrigerator and freezer insulation, for example). Other uses for the foam include road insulation and the like.

The invention is further illustrated by the following non-limiting examples. All parts and percentages are by weight unless otherwise indicated.

A convenient method of making the frothing agent consists of combining in an appropriate reactor 200 grams of a xylene solution (50% solids) of siloxane copolymer consisting essentially of $SiO_2$ units and $(CH_3)_3SiO_{1/2}$ units and varying amounts of an amine. The mixture will react at room temperature merely on standing for 16 to 24 hours. More usually the mixture is heated for 30 to 60 minutes at temperatures from about 130° to 190°C.

The three frothing agents used in the following examples are believed to have been prepared by reacting $H_2NCH_2CH_2NH(CH_2)_3Si(CH_3)(OCH_3)_2$ with the siloxane copolymer according to the above procedure in the following amounts: Frothing Agent I — 32.5 gms/100 gms of polymer, Frothing Agent II — 20 gms/100 gms of polymer and Frothing Agent III — 12.5 gms/100 gms of polymer.

EXAMPLE 1

A vinyl ester resin prepared by reacting one equivalent of methacrylic acid with one equivalent of D.E.R. 331 (diglycidyl ether of bisphenol A having an epoxide equivalent weight, EEW, of 186–192) was diluted with styrene (40% resin). To the resin was added 2.5 pph of Frothing Agent III and the mixture placed in a stainless steel bowl of a Hobart N–50 mixer. At a high speed setting of (No. 3) the resin would not froth after whipping for ten minutes with a wire whip beater.

EXAMPLE 2

Further tests were made with resins prepared as in Example 1 except that the resins were post reacted with 0.5, 0.75 and 1.0 equivalents of phthalic anhydride, respectively, per equivalent of hydroxyl to introduce pendant phthalate half ester groups.

Employing the same test as in Example 1 the following results were obtained.

| Equiv. of Phthalate | Foam Half-Life | Foam Density |
|---|---|---|
| none | — | — |
| 0.5 | 6 mins. | 17.7 lbs/ft³ |
| 0.75 | 33 | 13.8 |
| 1.0 | 60 | 13.8 |

The effect of the phthalate half ester on foam stability and on decreasing the density is apparent. Foam half-life is defined as the time required for the volume of foam to decrease to one-half its original volume.

EXAMPLE 3

Another vinyl ester resin prepared by first reacting a 2-hydroxypropyl acrylate half ester of maleic acid with D.E.R. 331 (1:1 equiv. ratio) followed by reaction of 0.6 equivalents of phthalic anhydride per equivalent of hydroxyl was diluted to a 50% concentration in styrene.

A foam was prepared by adding 7.2 gms of Frothing Agent III (50% solution) and 1.8 gms of benzoyl peroxide to 120 gms of the above resin and placed in a mixing bowl as before while maintaining an inert (nitrogen) atmosphere. N,N-dimethyl-p-toluidine (0.175 gm) was added as a catalyst accelerator and the mixture whipped for 10 minutes at speed setting No. 6. The froth was poured into an open-faced mold and allowed to cure. The resulting foam had a density of 19.9 lbs/ft³ and a screw holding strength of 254 lbs/in. of thread for a No. 6 wood screw.

EXAMPLE 4

In contrast to Example 3 a vinyl ester resin prepared by reacting the 2-hydroxyethyl acrylate maleate half ester with D.E.R. 331 (1:1 equiv. ratio) and containing 40% styrene produced negligible frothing with Frothing Agent I and only a slight froth with Frothing Agents II and III at 3 pph.

Tests made only with styrene showed that it frothed readily but the froth produced had no stability.

EXAMPLE 5

A vinyl ester resin prepared by reacting one equivalent of methacrylic acid with 0.5 eq. of D.E.R. 331 and 0.5 eq. of D.E.R. 661 (a solid bisphenol A based polyepoxide having an EEW of 475–575) was diluted to a 50% concentration in styrene. This resin would not froth with any of the three frothing agents at 3 pph.

In contrast to the above, if the resin is post reacted with 0.5, 0.75 and 1.0 equivalents of phthalic anhydride as in Example 2 stable froths are obtained with Frothing Agent III at 2.5 pph (40% styrene level). Froth densities were 30.3, 30.8 and 26.9 lbs/ft³ for the resins post reacted with 0.5, 0.75 and 1 equivalent of phthalic anhydride, respectively. Foam half life was greater than 200 minutes for all these resins. At 50% styrene the froth densities were 21.2, 21.2 and 19.0 lbs/ft³, respectively. At the higher phthalate levels foam half life was greater than 100 minutes and decreased to about 20 minutes at the 0.5 equivalent level. At 60% styrene the corresponding densities and foam half life were 17.7, 13.8 and 13.0 lbs/ft³ and 6, 33 and greater than 50 minutes. The best results are seen to be obtained at the higher phthalate levels and lower monomer levels. The latter is partly a function of higher viscosity.

EXAMPLE 6

A resin similar to Example 5 was prepared using 0.5 equivalents of maleic anhydride and compared to a similar resin with phthalate half ester groups at the same styrene level of 50 percent. Whereas the phthalate resin foam still retained about 80 percent of its initial foam volume after 90 minutes, the maleate resin retained only about 40 percent of its initial volume after about 25 minutes. In each case Frothing Agent III at 2.5 pph was used. In general resins with pendant maleate half ester groups are inferior to those with phthalate groups.

EXAMPLE 7

The resin of Example 3 produces good froth stability with Frothing Agents II and III at 3 pph with corresponding densities of 22.8 and 19.3 lbs/ft³. For some unknown reason Frothing Agent I was ineffective with this resin. This is the only anomalous result obtained.

The effect on apparent surface tension of Frothing Agent III at various levels with the above resin was measured. A sharp drop in surface tension with as little as 0.25 pph was found, after which there is little effect up to 10 pph. Similar tests also showed there is no additional lowering of the froth density by increasing the frothing agent concentration. Tests up to 12 pph were made. There is some indication that froth stability is improved with increased levels of frothing agent.

EXAMPLE 8

A resin prepared from one equivalent of methacrylic acid, 0.25 equivalent of D.E.R. 331 and 0.75 equivalent of D.E.N. 438 (an epoxy novalac having an EEW of 175–182) and diluted to a 55% resin concentration in styrene would not froth with any of the three frothing agents at 3 pph. Even though a low styrene level was used no froth was obtained.

EXAMPLE 9

A resin prepared by reacting one equivalent of a 2-hydroxypropyl acrylate maleate half ester with 0.75 eq. of D.E.R. 331 and 0.25 eq. of D.E.R. 741 (a polyglycol diepoxide having an EEW of 364–380) followed by reaction with 0.45 equivalents of phthalic anhydride was diluted to 50 percent in styrene. A foam half life of 100, 165 and 45 minutes was found with Frothing Agents I, II and III, respectively, at 3 pph.

Other amines which may be used to prepare frothing agents which may be substituted for those used in the previous examples include $(CH_3)NH(CH_2)_3Si(OCH_3)_3$, $(C_4H_9)NH(CH_2)_3Si(OCH_3)_3$, $H_2NCH_2CH_2NH(CH_2)_3Si(OCH_3)_3$, $(CH_3)_2N(CH_2)_3SiO_{3/2}$, $H_2N(CH_2)_3SiO_{3/2}$, and the like.

The rate of polymerization and exotherm temperature may be increased by increasing the amount of the accelerator used in combination with the catalyst. Other means of curing may be employed, for example, the resin of Example 3 was frothed with 2.5 pph of Frothing Agent II and cured by exposure to a high energy electron beam from a Van de Graaff accelerator without any chemical catalysts, etc.

A larger scale run with the resin of Example 3 on an Oakes mixer using 2 pph of Frothing Agent II successfully produced a foam with a density of 15.7 lbs/ft³. The foams are not brittle since nails can be driven into them within ¼ inch from the edge without splitting or breaking. The screw holding ability of the foams increases with density as shown in a series of tests where the strength increased from about 50 lbs. per inch of thread (No. 6 wood screw) at about 10.5 lbs/ft³ up to about 350 lbs. at about 29.5 lbs/ft³. The foams produced herein are predominantly open celled.

The corresponding effect of the need for phthalate groups in the resins was also indicated to be necessary with unsaturated polyester resins. A commercial resin prepared from dipropylene glycol, diethylene glycol, fumaric and maleic acids was diluted to a 60 percent styrene concentration. At a speed setting of No. 8 the resin would not froth upon being whipped for 10 minutes in the mixer with any of the three frothing agents at 3 pph.

A second commercial polyester of diethylene glycol, ethylene glycol, propylene glycol, fumaric acid, maleic acid and isophthalic acid was evaluated in the same manner as above with the following results.

| Frothing Agent | Froth Density | Froth Half-Life |
|---|---|---|
| I | 5.2 lbs/ft³ | ~30 minutes |
| II | 8.4 | ~75 |
| III | 8.5 | ~70 |

The isphthalate represented about 42 percent of the dicarboxylic acid content of this latter resin.

Another commercial resin which basically was a propylene glycol-maleic acid condensate but had a small amount of phthalic acid would not froth with 3 pph of Frothing Agent.

The above indicates that only certain kinds of unsaturated polyesters respond to the frothing agents and that a high proportion of isophthalate content is essential to successful frothing.

EXAMPLE 10

Using the resin of Example 3 a foam was prepared in an inert atmosphere by mixing 125 gms of resin (60% styrene), 1.5 gms of benzoyl peroxide, 6 gms of Frothing Agent III (50% solution) and 10 gms of low molecular weight polystyrene powder in the Kitchen-Aid mixing bowl for several minutes. Then, 0.5 gm of DMT accelerator was added and mixed for about 3 minutes before pouring the froth into a mold and allowing it to cure. The resulting foam did not crack during polymerization and had a density of 20.9 lbs/ft³.

EXAMPLE 11

The above example was repeated producing a foam having a density of 19.9 lbs/ft³. The foam cells were of small diameter and generally of uniform size.

EXAMPLE 12

Example 10 was repeated substituting a saran resin powder (vinylidene chloride/vinyl chloride, 85/15) for the polystyrene. The benzoyl peroxide level was raised to 2 gms. The resulting foam had a density of 17.0 lbs/ft³.

The polystyrene and saran resin additives did not prevent frothing or inhibit polymerization. They do increase the viscosity of the system which results in slightly higher densities. They do prevent cracking during polymerization.

EXAMPLE 13

Following the procedure of Example 10, 100 gms of resin, 1.9 gms of peroxide and 7.5 gms of frothing agent were mixed before 0.5 gm of DMT was added. After stirring for an additional 2 ½ minutes the froth was poured into a silastic mold having a hinged cover to restrict foaming volume and to give a wood-like detail to the surface. After curing overnight in the mold, the foam had a density of 14.4 lbs/ft³ and a woodscrew holding power of 133 lbs per inch of thread (No. 6 wood screw).

What is claimed is:

1. A non-aqueous thermosettable composition for making rigid plastic foams comprising a liquid resin consisting of 30 to 70 weight percent of a vinyl ester resin having pendant phthalate, isophthalate or terephthalate half ester groups and about 70 to 30 weight percent of a copolymerizable vinyl monomer, wherein said vinyl ester resin is prepared by reacting about equivalent amounts of an unsaturated monocarboxylic acid and a polyepoxide and esterifying at least about half of the hydroxyl groups formed from the acid-epoxide reaction to said half ester groups, and as a frothing agent at least about 1 pph of a copolymer containing (a) $SiO_2$ units, (b) $(CH_3)_3SiO_{1/2}$ units and (c) 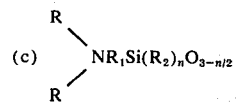

units wherein the ratio of (b) units to the sum of the (a) and (c) units is about 0.4:1 to 1.2:1 and wherein n has a value of 0 to 2, $R_2$ is an alkyl group having 1 to 6 carbon atoms, $R_1$ is an alkylene radical of 1 to 6 carbon atoms and R is hydrogen, an alkyl radical of 1 to 6 carbon atoms or an aminoalkyl radical having 2 to 6 carbon atoms.

2. The composition of claim 1 wherein $R_2$ is methyl, n is 1, one R is hydrogen and the other R is $H_2NCH_2CH_2-$.

3. The composition of claim 1 wherein the unsaturated monocarboxylic acid is methacrylic or acrylic acid.

4. The composition of claim 3 wherein the resin has pendant phthalate half ester groups.

5. The composition of claim 1 wherein the unsaturated monocarboxylic acid is a hydroxyalkyl acrylate or methacrylate half ester of a dicarboxylic acid having 2 to 6 carbons in the alkyl group.

6. The composition of claim 5 wherein the alkyl group has 2 or 3 carbon atoms.

7. The composition of claim 5 wherein the resin has pendant phthalate half ester groups.

8. A process for preparing a foam comprising the steps of frothing the composition of claim 1 and polymerizing the frothed resin employing means to exclude oxygen.

9. A process for preparing a foam comprising the steps of frothing the composition of claim 2 and polymerizing the frothed resin employing means to exclude oxygen.

10. A process for preparing a foam comprising the steps of frothing the composition of claim 3 and polymerizing the frothed resin employing means to exclude oxygen.

11. A process for preparing a foam comprising the steps of frothing the composition of claim 4 and polymerizing the frothed resin employing means to exclude oxygen.

12. A process for preparing a foam comprising the steps of frothing the composition of claim 5 and polymerizing the frothed resin employing means to exclude oxygen.

13. A process for preparing a foam comprising the steps of frothing the composition of claim 6 and polymerizing the frothed resin employing means to exclude oxygen.

14. A process for preparing a foam comprising the steps of frothing the composition of claim 7 and polymerizing the frothed resin employing means to exclude oxygen.

* * * * *